United States Patent Office 2,833,054
Patented May 6, 1958

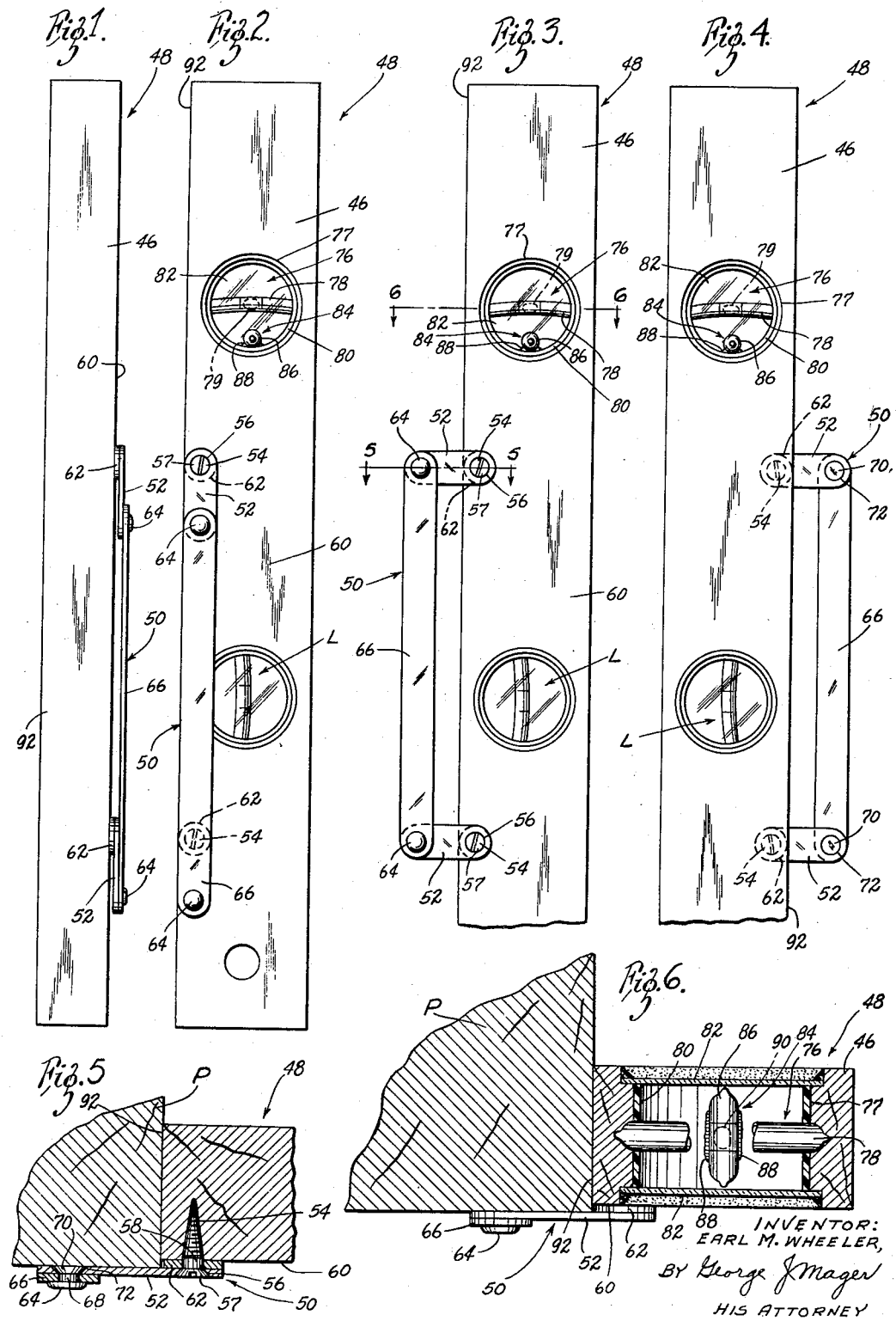

2,833,054
COMBINED LEVEL AND PLUMB INDICATING INSTRUMENT

Earl M. Wheeler, Belleville, Ill.

Application December 6, 1954, Serial No. 473,256

1 Claim. (Cl. 33—207)

The present invention relates generally to instruments for use in the building trades, whereby the horizontal and vertical dispositions of structural members may be determined relatively to the horizon and to the center of gravity of the earth.

More specifically, the present invention is directed to the provision of a novel instrument incorporating conventional means for determining the level disposition of objects, and further incorporating means adapted to simultaneously exhibit to a mechanic the requisite procedure to bring a post, a door or window frame, a steel or concrete column and so on, into a status of absolute verticality in consequence of a single application of said instrument.

Conventional level instruments require tedious and repetitious applications thereof to structural members being erected in order to assure that their ultimate disposition be plumb. More explicitly stated, these instruments, when applied to a structural element in the well-understood manner, indicate to the mechanic the plumb factor of the surface against which the instrument is applied, but do not indicate the concurrent plumb factor obtaining with respect to a surface or surfaces disposed in a plane 90° removed from that against which the level is positioned.

The primary object of the present invention is to overcome such disadvantages, by incorporating in a single instrument means whereby the plumb factor relatively to two surfaces of a structural member may be determined simultaneously in consequence of one application thereto of said instrument.

To this end, the present invention provides a novel combined level and plumb indicating instrument that includes a main body having an elongated rectangular configuration, and a linkage pivotally mounted thereon. The instrument of my invention is portable, and easily manipulable in order to achieve said primary objective.

The invention is illustrated on a sheet of drawings, and further objects and advantages will be apparent from the detailed description thereof to follow with reference to these drawings, and from the explanation of the operation that will be given.

In said drawings:

Figure 1 is a left side elevational view of a novel instrument constructed in accordance with the concepts of the present invention;

Figure 2 is a front elevational view thereof;

Figure 3 is a view similar to Figure 2, an included linkage being shown in a moved position relatively to that it occupies in Figure 2;

Figure 4 is a rear elevational view of the instrument in its Figure 3 status;

Figure 5 is an enlarged horizontal sectional view taken on the line 5—5 of Figure 3, demonstrating the instrument in use with respect to a wooden post that is fragmentarily shown in horizontal section; and Figure 6 is an enlarged horizontal sectional view taken on the line 6—6, also demonstrating the instrument in use with respect to said post.

With reference to said drawings, numeral 48 indicates generally an instrument incorporating the principles of the present invention. The illustrated instrument is of generally wooden construction, but it is to be understood that it may also be fabricated of aluminum or other lightweight metallic material.

The main body portion 46 of the instrument 48 has an elongated rectangular configuration as shown, and mounted thereon is a linkage generally designated by the numeral 50. This linkage includes a pair of identical short links 52 spaced longitudinally of the instrument, each link being pivotally secured at what will be termed the inner end thereof to the body 46 by means of a headed screw 54. As seen to best advantage in Figure 5, said inner end of each link 52 is provided with a countersunk hole 56 to receive the flared head 57 of one of the screws 54, and interposed about the unthreaded shank segment 58 of said screw between the link and the front face 60 of the instrument body, is a washer 62.

The free or outer end of each link 52 has a pivotal connection 64 with one end of a long link 66 hereinafter sometimes termed the operating link. Each pivotal connection 64, as also seen in Figure 5, comprises a rivet including a cylindrical shank segment 68 and a flared or conical segment 70, the last-named segment being received in a countersunk hole 72 provided therefor in the outer end of the link 52.

Normally, that is when the instrument is not in use, or is in use to determine horizontal elevations by means of the conventional level assembly generally designated L, the linkage 50 is disposed as shown in Figure 2. In use to determine the verticality of a structural member or the like, the linkage is manually swung to the position thereof illustrated in Figures 3 and 4 by means of the operating link 66.

It is noted that the countersunk openings 56 and 72 of the short links 52 snugly engage the flared heads 57 and 70 respectively, and that the pivotal connections 64 are of the yieldingly frictional type, wherefore when the linkage is in either its Figure 2 or Figure 3 disposition, it is so to speak self-retained in such positions.

Numeral 76 designates a conventional plumb level assembly mounted in a generally circular opening 77 provided therefor in the instrument body 46. The assembly 76 includes a vial 78 not quite entirely filled with fluid whereby to produce the well known air bubble 79, means including the usual ring 80 for supporting the vial, and a pair of sight glasses 82 sealing the opening 77 on both sides of said vial.

In accordance with the teachings of my invention, a cross level generally designated 84 is incorporated in the assembly 76 prior to the application of the sight glasses 82. The cross level 84, as most clearly seen in Figure 6, consists of a vial 86 that is rigidly secured to the inner periphery of the ring 80 by means of a suitable cement or other adhesive agent suggested at 88. The vial 86 is disposed at right angles to, and directly below the central portion of the vial 78, being located on the vertical centerline of the instrument as viewed in Figures 2 through 4. The central area of the vial 86 is defined by the usual etched lines, and said vial is not quite entirely filled with fluid whereby to produce an air bubble 90 in the usual manner.

Fragmentarily shown in Figures 5 and 6, is a horizontal sectional view of a wooden post P. With the linkage 50 disposed as in Figure 3, the instrument 48 may be applied to the post P in order to determine the plumb or out of plumb status of said post at a single reading. In other words with the instrument held against one corner of the post in such fashion that the short links 52 lie flush with the front face of the post, and the side surface 92 of the body 46 lies flush with the side face of the post, the verticality factor may be quickly determined and said post may be plumbed accordingly, as should be understood without further explanation. It will be observed with reference to Figures 1, 5, and 6 particularly, that the washers 62 not only serve to facilitate operation of the linkage 50, but further serve to maintain the short links 52 in aligned disposition relatively to one another.

From the foregoing description augmented by an inspection of the drawings, it is believed that a comprehensive understanding of the invention and its advantages should be apparent.

The invention may obviously be modified in some respects without departing from the principles thereof as defined within the scope of the claim hereunto appended.

What I claim is:

An instrument of the character and for the purpose described comprising in combination: a main body having an elongated rectangular configuration; a first level assembly having its spirit vial disposed transversely thereof mounted in the upper end portion of said main body; a cross level rigidly incorporated in said first level assembly consisting of a spirit vial disposed at right angles to and directly below the vial of said assembly; a second level assembly having its spirit vial disposed longitudinally thereof mounted in the lower end portion of said main body; and manually operable linkage pivotally mounted on the main body aforesaid whereby the instrument may be disposed against the corner surfaces of an upright structural member, said linkage including: a pair of identical short links spaced longitudinally of the instrument, each link being pivotally secured at its inner end to said body by means of a screw having a flared head engaging in a countersunk hole provided therefor in the link; a washer interposed about an unthreaded shank segment of the screw between said link and the adjacent face of the instrument body; and a long operating link having a pivotal connection at each end with the free outer end of one of said short links, each pivotal connection comprising a rivet including a cylindrical shank segment extending through a circular opening in the operating link, and a conical segment disposed in a countersunk hole provided therefor in the free outer end of the adjacent short link.

References Cited in the file of this patent

UNITED STATES PATENTS

| | | |
|---|---|---|
| 232,982 | Langdon | Oct. 5, 1880 |
| 1,855,394 | Hill | Apr. 26, 1932 |
| 2,074,563 | Schuettinger | Mar. 23, 1937 |
| 2,466,829 | Sprinkel | Apr. 12, 1949 |
| 2,645,018 | Waddell | July 14, 1953 |